United States Patent
Labeye et al.

[11] Patent Number: 5,937,132
[45] Date of Patent: Aug. 10, 1999

[54] PROCESS AND SYSTEM FOR POSITIONING AND HOLDING OPTICAL FIBERS

[75] Inventors: Pierre Labeye, Grenoble; Patrick Pouteau, Voreppe; Claude Chabrol, Echirolles; Hervé Denis, St. Martin le Vinoux, all of France

[73] Assignee: Commissariat A L'Energie Atomique, Paris, France

[21] Appl. No.: 08/848,280

[22] Filed: Apr. 29, 1997

[30] Foreign Application Priority Data

May 10, 1996 [FR] France .................................. 96 05841

[51] Int. Cl.⁶ ..................................................... G02B 6/00
[52] U.S. Cl. ............................................................ 385/137
[58] Field of Search ............................ 385/80–88, 137, 385/147

[56] References Cited

U.S. PATENT DOCUMENTS

| 4,183,616 | 1/1980 | Benoit et al. ........................... 385/88 |
| 5,506,928 | 4/1996 | Evans et al. ........................... 385/136 |

FOREIGN PATENT DOCUMENTS

| 2 659 148 | 3/1990 | France . |
| 55-065913 | 7/1980 | Japan . |
| 60-086514 | 5/1985 | Japan . |
| 8700298 | 1/1987 | WIPO . |

OTHER PUBLICATIONS

Patent Abstracts of Japan, vol. 4, No. 107 (p. 21), Jul. 31, 1980, JP–55 065913 A (Nippon Telegr & Teleph Corp), May 17, 1980.
Patent Abstracts of Japan, vol. 9, No. 232 (p. 389), Sep. 18, 1985, JP–60 086514 A (Nippon Denshin Denwa Kosha), May 16, 1985.
Patent Abstracts of Japan, vol. 95, No. 9, Oct. 31, 1995, JP–07 151929 A (Hitachi Cable Ltd), Jun. 16, 1995.
Patent Abstracts of Japan, vol. 16, No. 15 (p. 1298), Jan. 14, 1992, JP–03 233412 A (Nec Corp), Oct. 17, 1991.

*Primary Examiner*—Akm E. Ullah
*Attorney, Agent, or Firm*—Burns, Doane, Swecker & Mathis LLP

[57] ABSTRACT

A device for the positioning and holding of an optical fiber having a substrate, a groove for receiving the optical fiber, and at least one first and one second groove widenings along a longitudinal axis of said groove. An adhesive substance is introduced in one of the two widenings, said adhesive substance fixing the fiber to the substrate. A process for fixing a fiber to a substrate includes the steps of positioning the fiber, holding said fiber with a tool, and introducing an adhesive substance for fixing the fiber to a substrate.

23 Claims, 4 Drawing Sheets

PROCESS AND SYSTEM FOR POSITIONING AND HOLDING OPTICAL FIBERS

DESCRIPTION

TECHNICAL FIELD AND PRIOR ART

The present invention relates to the field of positioning and holding optical fibres. It more particularly applies to the field of integrated optics, where optical fibres are means appropriate for bringing about the coupling and decoupling of light into and from integrated optical components. More specifically, such coupling and decoupling problems arise when integrated optical components have optical microguides. As a result of the relatively small dimensions of both the integrated optical components and in particular the microguides and optical fibre, it is necessary to use mechanical structures for bringing about a relatively precise positioning of the two elements in front of one another.

FR-A-2 659 148 describes a connection process between an optical fibre and an optical microguide. This document uses a single support, namely the substrate on which is produced the optical microguide and in which a recess is made for the positioning and holding of the optical fibre in front of said microguide. The procedure described in this document suffers from a disadvantage, because there is nothing to facilitate the deposition of adhesive once the fibre is in position. Another disadvantage relates to the gripping of the fibre and the overall dimensions of the gripping system. The fibre can only be gripped on the upper half-cylinder defined by the upper portion of the fibre.

Another known device is illustrated in FIGS. 1A (plan view) and 1B (sectional view along I—I). The device essentially comprises a substrate 2 in which are etched notches 4-1, . . . 4-n for positioning n optical fibres 8-1, . . . , 8-n. Once a fibre 8-1 is positioned in its notch, a drop of adhesive 10 is deposited on said fibre. A transverse trench 6 is made to prevent the diffusion of adhesive between two areas 12, 14 on either side of the trench. In other words, the adhesive is introduced into at least one of the two areas, but not into the trench. Thus, nothing is provided in this device for facilitating the deposition of adhesive after putting the fibre into position. Once again such a structure only permits the gripping of the fibre in a portion of its upper half-system using a gripping system with limited overall dimensions (the overall dimensional problem of the gripping system is not taken into account).

DESCRIPTION OF THE INVENTION

The invention relates to a device permitting a precise positioning of an optical fibre on a substrate, an improved deposition of adhesive between the fibre and the substrate, and a better holding of the fibre during the positioning and adhesion operations.

More specifically, the invention relates to a device for the positioning and holding of an optical fibre, having a substrate, a groove for receiving an optical fibre, and at least one first and second widenings of the groove, along a longitudinal axis of the latter.

One or other of the groove widenings makes it possible to deposit adhesive in the bottom of the fibre holding structure or substrate. Thus, this widening leaves a free space between the fibre and the substrate, by which the adhesive can be introduced before and/or after the positioning of the fibre in the groove. The other widening makes it possible to hold the fibre with a larger gripping or handling tool, so as to hold a larger circumference of the fibre than in the prior art devices.

In the present application the term "adhesive" refers to any substance which is adhesive with respect to the surface of the substrate and that of the fibre. One example is an epoxy adhesive for a silicon substrate and a silica fibre.

The invention also relates to a device for the positioning and holding of N optical fibres, incorporating a substrate, N parallel grooves in each case for receiving an optical fibre and each having a longitudinal axis, as well as at least one first and one second widening of each groove, along the longitudinal axis thereof.

In the case of N optical fibres, the effects obtained with the aid of the first and second widenings of each groove are the same as those described hereinbefore.

In this second case (plurality of optical fibres), the first widening of at least one groove can be provided so as to communicate with the first widening of at least one neighbouring groove.

In the same way, the second widening of at least one groove can communicate with the second widening of at least one neighbouring groove.

The invention also relates to a process for fixing an optical fibre to a substrate of a device of the type described hereinbefore, comprising positioning the optical fibre in the substrate groove, the holding of the fibre end with the aid of a tool at at least one point of the fibre facing one of the widenings and introduction of adhesive into the groove by the other groove widening.

The adhesive introduction stage can take place prior to the positioning of the fibre in the groove and/or after the holding thereof in the groove widening. Moreover, the stage of positioning the fibre in the groove can coincide with the holding stage (the gripping stage then making it possible to bring the fibre into the groove). In this case, the tool is used both for positioning and holding. Following the hardening of the adhesive, the said tool is detached from the fibre. Thus, the invention permits a precise holding of the fibre during the adhesion phase.

The invention also relates to various tools for positioning and holding a fibre and usable with a device according to the invention.

BRIEF DESCRIPTION OF THE DRAWINGS

The features and advantages of the invention can be better gathered from the following description of non-limitative embodiments and with reference to the attached drawings, wherein show.

DETAILED DESCRIPTION OF EMBODIMENTS OF THE INVENTION

Figure 1A:
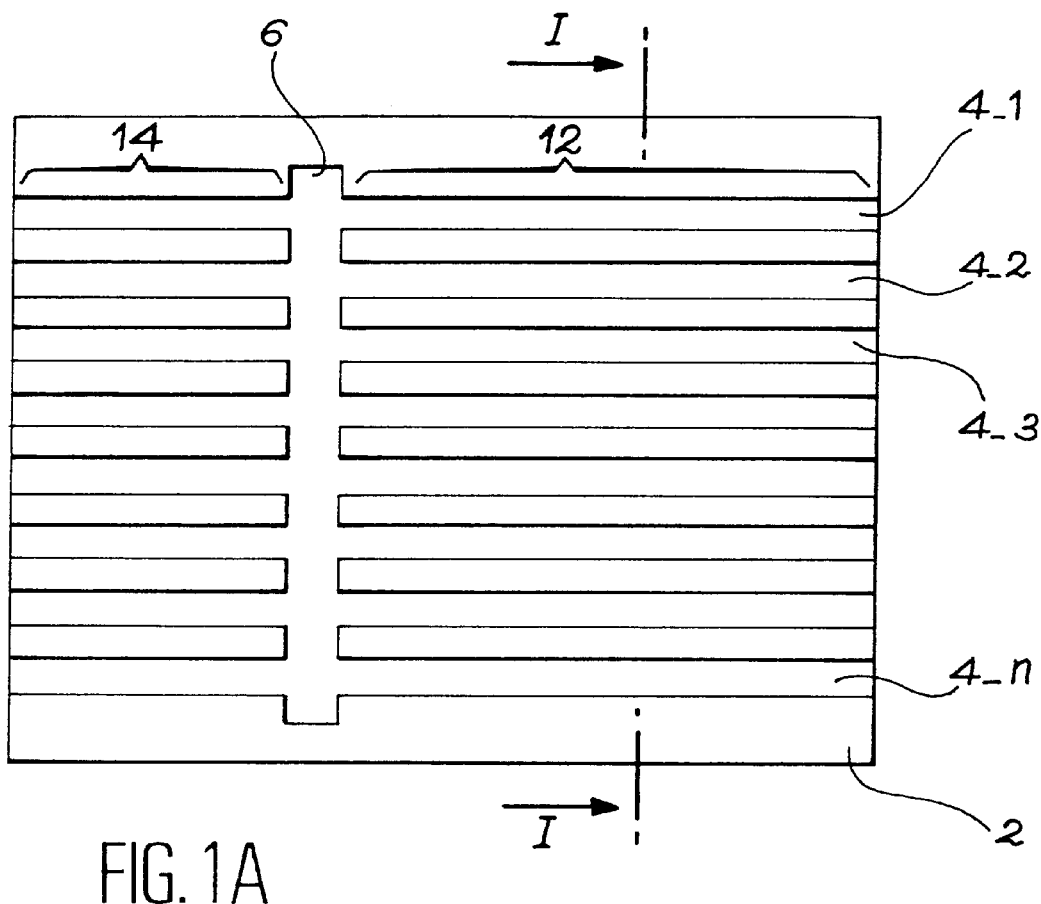
FIGS. 1A and 1B, already described, a prior art device for positioning a plurality of optical fibres.
Figure 1B:
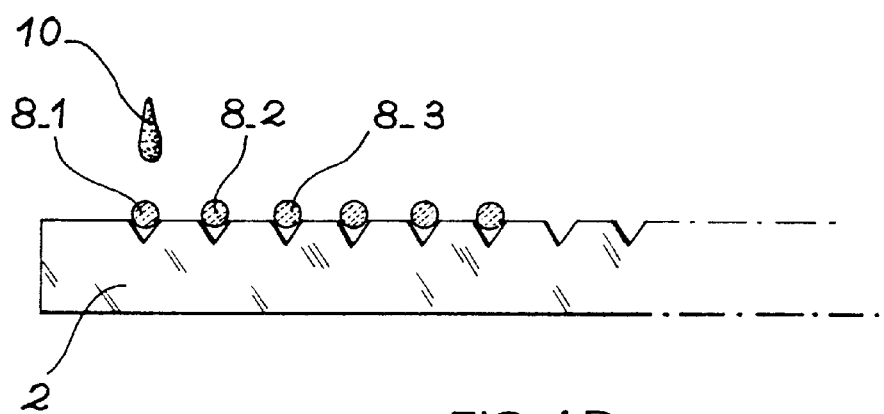
Figure 2A:
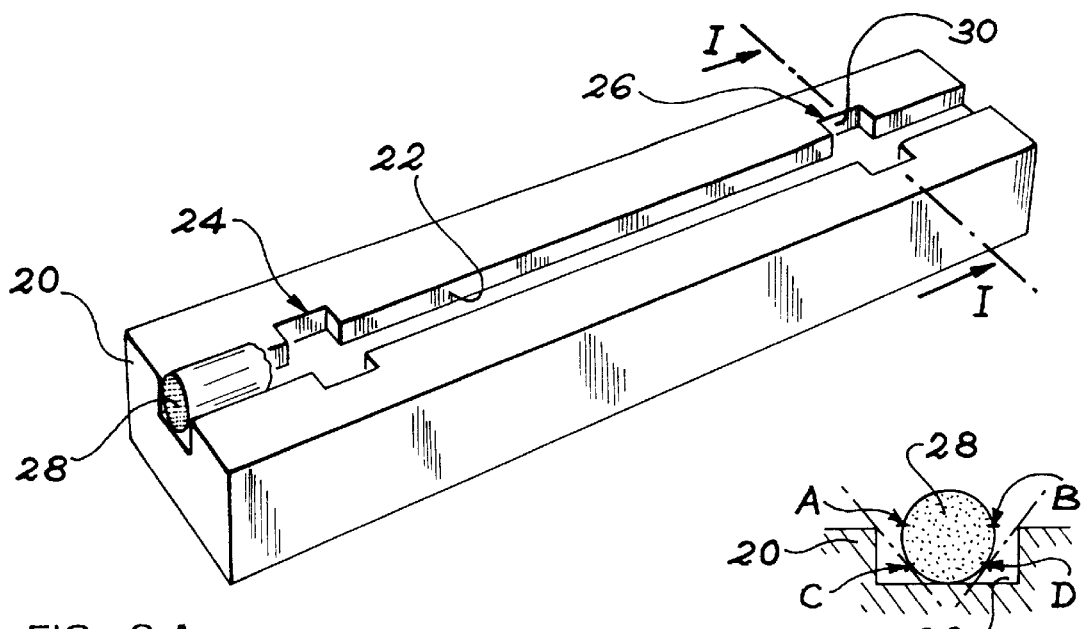
FIGS. 2 and 2B A perspective and sectional view of a device according to the invention for holding an optical fibre.
Figure 2B:
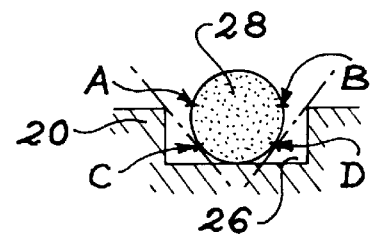

FIG. 2A illustrates a first embodiment of the invention. A groove 22 is made in a substrate 20. There are at least two notches 24, 26 defining widenings of the groove 22. In an unwidened portion of the groove 22, the latter has substantially the same size as an optical fibre 28 for positioning therein. However, in the widened areas such as 26, a space is provided between the inner edges 30 of the substrate 20 and the optical fibre 28. For example, after roughly positioning the fibre in the groove 22, a gripping and holding tool embracing the fibre is positioned level with one of the widenings and the adhesive can be introduced into the other widening between the inner edges of the substrate and the optical fibre. Thus, there is a better penetration of the adhesive below the latter. Moreover, the gripping tool can penetrate the groove widening, so as to hold the fibre on a large surface which can be larger than that defined by its upper half-cylinder. FIG. 2B shows a section of the device of FIG. 2A along the axis I—I. It can be seen that as a result of the widening 26, the fibre 28 can be held not only in accordance with the upper half-cylinder (AB in FIG. 2B), but also along the lateral surfaces, i.e. AC and BD in FIG. 2B. A better holding is therefore ensured during the adhesion or bonding operations.

Thus, although the invention permits holding over a greater surface of the fibre, it is not limited thereto. Thus, a holding of only a portion of the surface of AB can be sufficient.

Within the scope of this first embodiment, only two widenings are shown along the notch 22. In actual fact, a larger number of widenings can be provided, particularly for increasing the number of adhesive introduction points and/or holding points for a large gripping tool.

Moreover, widenings can have bounded or closed ends (as shown in FIGS. 2A and 2B) or open ends. As a function of the viscosity of the adhesive substance used, it may be preferable to use bounded widenings. This is in particular the case for a more fluid substance.

Figure 3A:
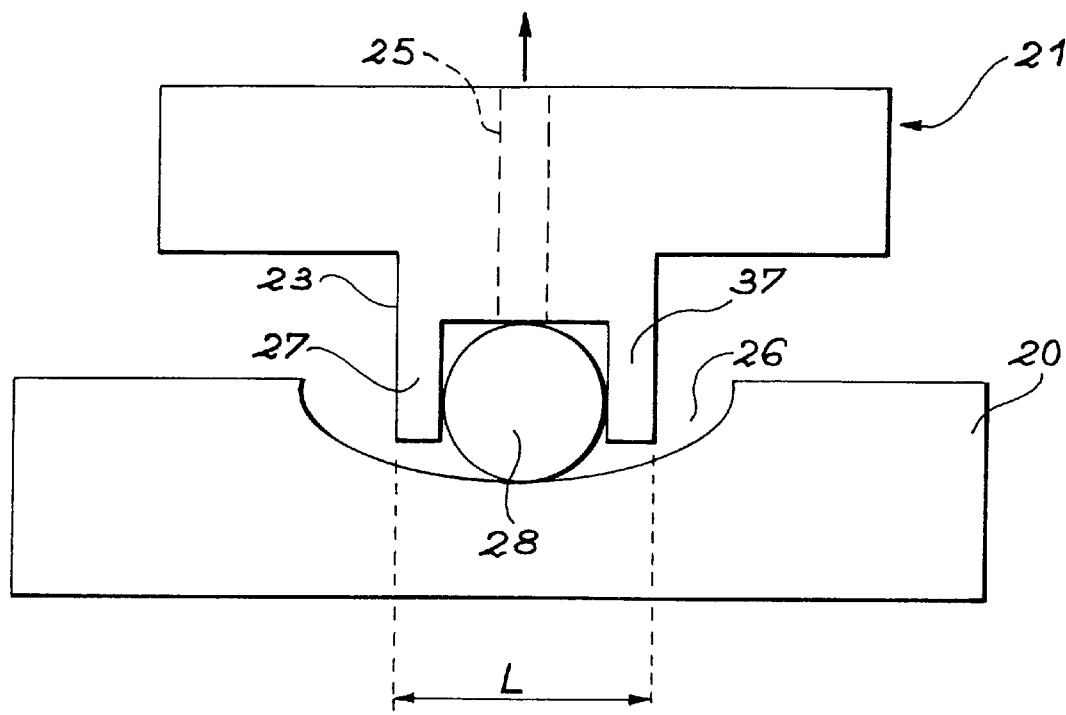
FIGS. 3A and 3B Examples of fibre gripping tools.
Figure 3B:
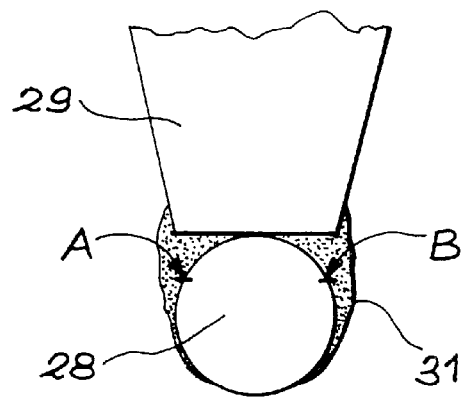

Two examples of usable positioning and holding tools are illustrated in FIGS. 3A and 3B.

In the case of FIG. 3A, the fibre 28 is held with the aid of a gripping tool 21 having a head 23, whose width L exceeds the fibre diameter. A suction pipe 25 connected to not shown suction means maintains the fibre 28 in the head 23. The fibre is fixed between two lugs or posts 27, 37. This tool permits holding on the upper half-cylinder. Variants of said tool can be produced in order to permit a significant holding on a surface smaller than the half-cylinder.

Thus, the tool of FIG. 3B has a heating point 29 and a wax coating 31. This tool permits holding on a surface larger than the upper half-cylinder (AB). The freeing of the tool then takes place by heating to a temperature higher than the melting point of the wax 31.

Figure 4:
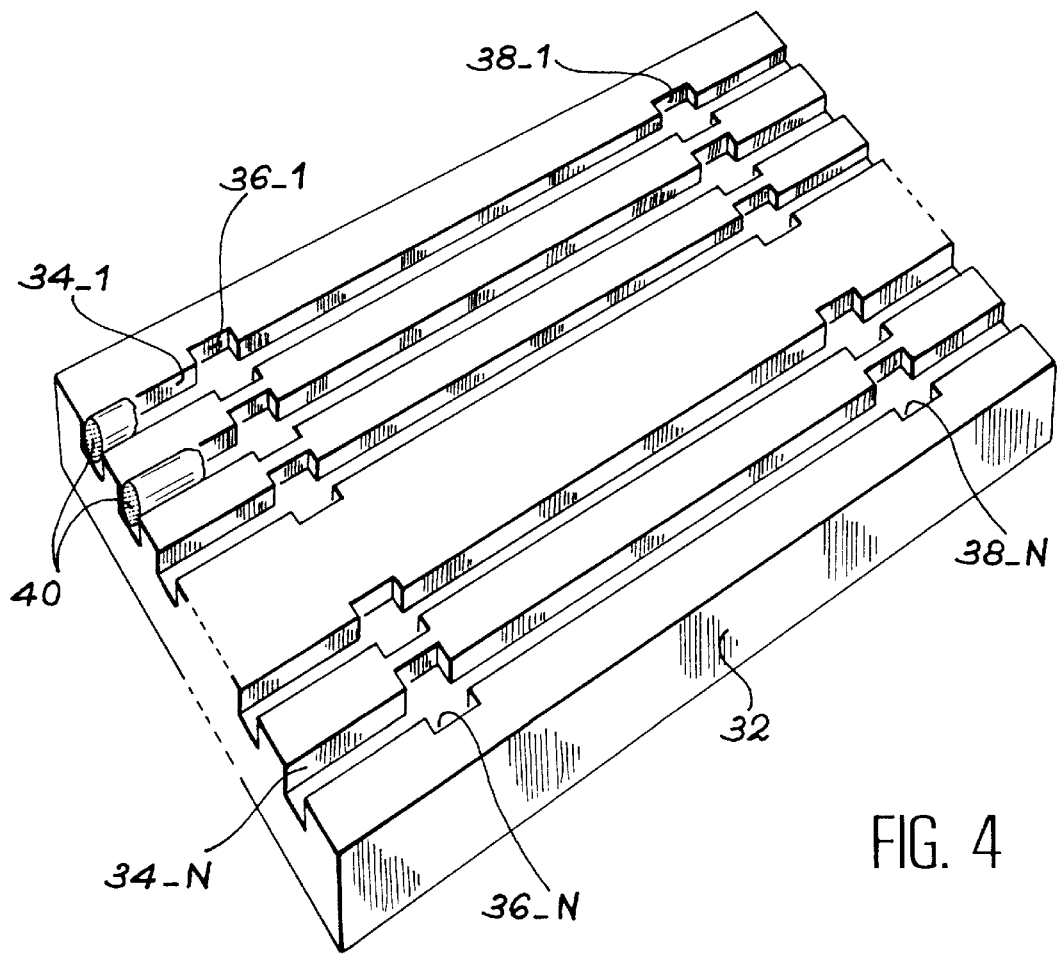
FIG. 4 A perspective view of a device according to the invention for holding N optical fibres.

Another embodiment of the invention will be described in conjunction with FIG. 4, where there are N grooves 34-1, . . . , 34-N in a substrate 32. Along each groove, there are at least two widenings 36-1, . . . , 36-N and 38-1, . . . , 38-N. For each groove, the function of each of the two widenings is the same as that described herein-before for the first embodiment.

The widenings can have bounded or closed ends (as in FIG. 4) or open ends. As a function of the viscosity of the adhesive substance used, it can be preferable to use bounded widenings.

When there is an intercommunication of the widenings, they form a trench which can be bounded or closed at its ends or alternatively open. The use of a closed, bounded trench can be advantageous as a function of the viscosity or fluidity of the adhesive substance used.

Moreover, for each groove, there can be more than two widenings in order to increase the number of fibre holding and/or adhesion points.

There again the widenings 38-1, 38-N permit a holding of the fibre 40 on a surface which can exceed that limited by its upper half-cylinder using a gripping tool able to penetrate said widenings. Such a tool can be of the type described in conjunction with FIGS. 3A and 3B. In addition, the widenings 36-1, 36-N facilitate the introduction of an adhesive between the fibres 40 and the substrate 32. The positioning and holding of the fibres can take place individually or collectively with appropriate adhesive distribution and gripping tools.

In all the cases, the form of the etchings made (no matter whether it is for the groove or the widenings thereof) depends on the material in which the structure is produced, as well as the method used for producing an etching. In the case of a silicon substrate, it is possible to use wet or dry, isotropic or anisotropic etching methods. It is also possible to use moulding polymers for producing a device with groove and widening.

Figure 5:
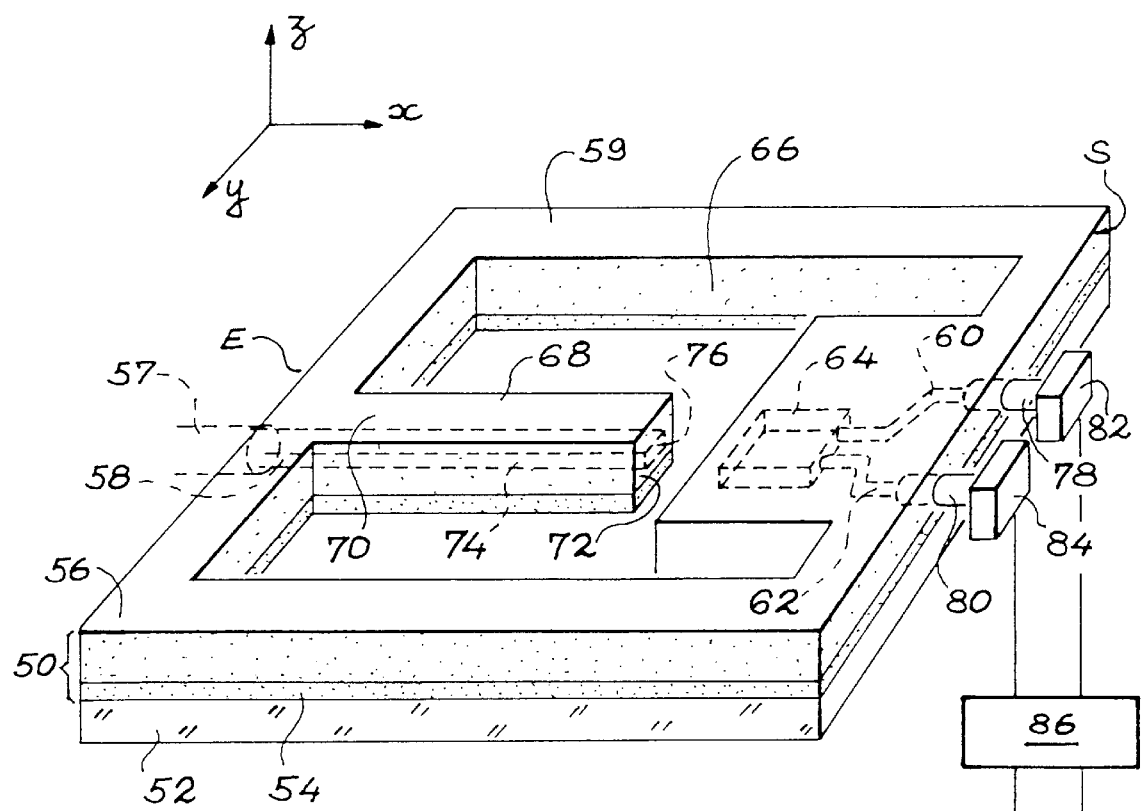
FIG. 5 A device in which the optical fibre holding means according to the invention are used.

FIG. 5 shows a device for implementing optical fibre positioning structures according to the invention and which is of an opto-mechanical type. It comprises a planar layer or guide structure 50 (which can be formed by one or more layers), produced on a substrate 52, e.g. of monocrystalline silicon, and which has an input face E and an output face S parallel to one another and e.g. obtained by cleaving. The guide structure 50 e.g. has a 8 to 12 $\mu$m thick, silicon oxide buffer layer 54 and a 2 to 10 $\mu$m thick upper, silica layer 56, whereby the latter can be replaced by air for certain applications.

The guide structure also has an input microguide 58 and two output microguides 60, 62, of silicon oxide, e.g. doped with phosphorus, with a height of 2 to 6 $\mu$m and a width of 2 to 8 $\mu$m, as well as a multimode coupler 64 having substantially the same height (2 to 6 $\mu$m), for a typical width of 10 to 50 $\mu$m. The microguides 58, 60, 62 are parallel to a direction x, which is itself parallel to the largest surface 59 of the planar layer or guide structure 50 and are positioned on either side of a recess 66 traversing the guide structure 50.

In the guide structure 50 and the substrate, the recess 66 defines a flexible beam 68 oriented in the inoperative state parallel to the direction x, whereby said beam can move into the recess 66 in a direction y parallel to the surface 59 of the guide structure and perpendicular to the direction x. This beam 68 has a fixed end, integral with the fixed part, and a free end 72 displaceable into the recess 66. In the extension of the input microguide 58, a central microguide 74 extends over the entire length of the beam 68, its end 76 issuing at the end 72 thereof.

The multimode coupler 64 is placed facing the end 76 of the micro-guide 74. The term multimode coupler is understood to refer to a coupler or multimode guide having several propagation modes or several monomode guides.

The length L of the multimode coupler 64 is preferably such that when an incident beam I directed on the input section of the coupler has an intensity distribution with a single maximum, an output beam is obtained having a maximum number N with N≧2.

The conditions for obtaining such a result are e.g. given by the analytical method described for multimode couplers in an article by R. Ulrich et al. entitled "Self imaging in homogeneous planar optical waveguides", published in Applied Physics Letters, vol. 27, No. 6, 15.9.1975, pp 337–339.

When the system is in the inoperative state, i.e. when the input beam of the coupler 74 is centred on its axis of symmetry, at the output are obtained N maxima distributed symmetrically with respect to the axis of symmetry of the coupler. When the input beam is offcentred, the intensity distribution at the coupler output is unbalanced.

This device functions as follows. An optical signal is produced by a radiation source (e.g. at wavenength 0.78 $\mu$m) not shown in FIG. 5 and is then transmitted by an input optical fibre 57 and the microguide 58 and then 74 in the direction of the multimode coupler 64. On leaving the latter, N output guides 60, 62 (N=2 in FIG. 5) transmit the radiation from the coupler 64 to N optical fibres 78, 80, which are connected to N photodetectors 82, 84. Each output microguide is positioned at the formation point of a maximum, at the coupler output, when the input beam is in a position centred on the input of the coupler. Each detector delivers a signal representative of the optical signal transmitted by the optical fibre at the output of which it is located. Finally, said detectors are connected to means 86 for processing the signals which they supply.

When a vibration or acceleration occurs, the free end of the beam 68 is moved in the direction y, which modifies the distribution of the radiation at the output of the multimode coupler and therefore of the radiation transmitted by the N output guides 60, 62 and consequently the signal produced by the detectors 82, 84. The displacement $d_y$ is linked with the acceleration $\gamma$ of the vibration by the relation:

$$d_y = \frac{\gamma}{(2\pi f_o)^2} \quad (1)$$

where $f_o$ is the natural resonant frequency of the beam 68.

An example of a process for producing such a device comprises the following stages:

- a stage of forming the layer 54, e.g. by thermal oxidation of the substrate 52,
- the deposition of a silica layer by LPCVD or PECVD, which is e.g. doped with phosphorus,
- a stage of producing, e.g. by photolithography a positive resin mask masking the areas intended to constitute the microguides 74, 60, 62 and the multimode coupler 64 (or coupled monomode guides),
- an anisotropic etching stage of the reactive ionic type performed through said mask, in order to obtain the microguides and the multi-mode coupler, the mask then being eliminated with an oxygen plasma,
- a stage of depositing the layer 56 by LPCVD or PECVD,
- a stage of producing another mask (as hereinbefore), in order to free the beam 68,
- an anisotropic etching stage of the reactive ionic etching type using e.g. $CHF_3$, said stage making it possible to etch the layers 54 and 56 both for defining the beam and the connection areas,
- an isotropic etching stage (reactive ionic etching e.g. with $SF_6$) of the silicon substrate 52, using the same mask, in order to free the beam from the substrate, as well as complete the production of the connection areas of the optical fibres 78, 80.

Figure 6:
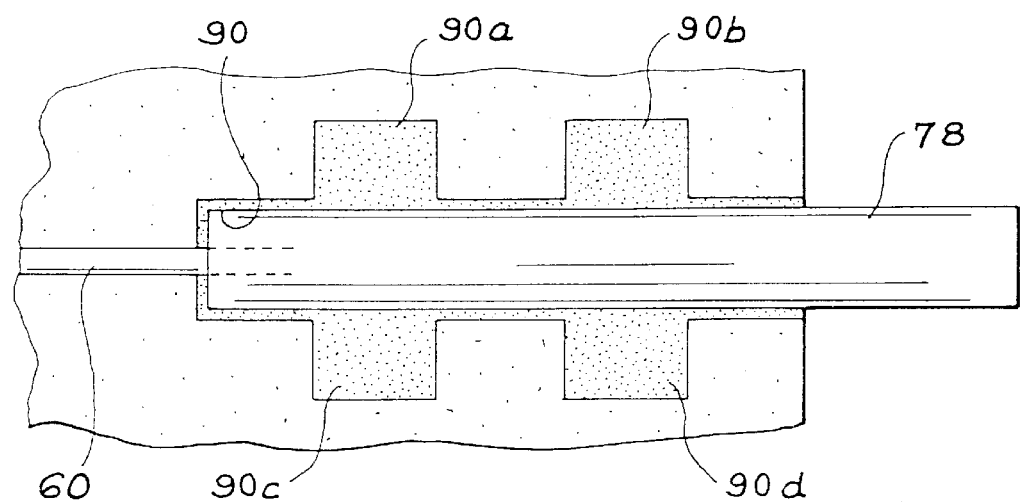
FIG. 6 A detail of the device of FIG. 5 relating to the holding of the optical fibres.

The thus defined connection areas correspond to the groove for receiving the optical fibres. Moreover and as illustrated in FIG. 6 (which only shows one of the output guides and the corresponding optical fibre), the connection area 90 for fibre 78 can also be widened at certain locations 90a, 90b, 90c, 90d in accordance with the invention, so as to facilitate the supply of optical adhesive and permit the holding of the fibres. The widenings 90a–90d are produced at the same time as the connection area 90, which is applicable to the connection area of each of the fibres 57, 78, 80.

We claim:

1. Device for the positioning and holding of an optical fibre, comprising an optical fibre, a substrate, a groove receiving the optical fibre and at least one first and one second widenings of the groove along the longitudinal axis of said groove, and an adhesive substance being introduced into one of the two widenings, the widening receiving the adhesive substance being bounded to contain the adhesive substance and said adhesive substance fixing the fibre to the substrate.

2. Device for the positioning and holding of N optical fibres, comprising N optical fibres, a substrate, N parallel grooves each receiving one of the optical fibre and each having a longitudinal axis and at least one first and one second widenings of each groove, along the longitudinal axis thereof, and an adhesive substance being introduced into one of the two widenings of each groove, the widenings receiving the adhesive substance being bounded to contain said adhesive substance and said adhesive substance fixing the corresponding fibre to the substrate.

3. Device according to claim 2, the first widening of at least one groove communicating with the first widening of at least one neighbouring groove.

4. Device according to claim 3, the first widenings defining between them a trench bounded at its ends.

5. Device according to claim 2, the second widening of at least one groove communicating with the second widening of at least one neighbouring groove.

6. Device according to claim 5, the second widenings defining between them a trench, which is bounded at its ends.

7. Process for fixing an optical fibre to a substrate of a device, the latter having, apart from the substrate, a groove for receiving said optical fibre and at least one first and one second widening of the groove, along a longitudinal axis of the latter, the process comprising the positioning of the optical fibre in the substrate groove, the holding of the fibre with the aid of a tool at at least one point of the fibre facing one of the widenings and the introduction of an adhesive substance into the groove, by the other widening of said groove, said substance making it possible to fix the fibre to the substrate.

8. Process for fixing optical fibres to a substrate of a device comprising, apart from the substrate, N parallel grooves, each intended to receive an optical fibre, and each having a longitudinal axis and at least one first and one second widening of each groove, along the longitudinal axis thereof, the fixing process comprising, for each optical fibre the stages of positioning the optical fibre in one of the grooves of the substrate, the holding of the fibre with the aid of a tool at at least one point of the fibre facing one of the widenings of the groove in which it is positioned and introducing an adhesive substance into said groove, via the other widening of the groove, said substance making it possible to fix the fibre to the substrate.

9. Process according to claim 7, the widening closest to the end of each fibre being used for introducing the adhesive substance, the other being used for holding the fibre.

10. Process according to claim 7, the stage of introducing the adhesive substance taking place prior to the positioning of each fibre in the groove.

11. Process according to claim 7, the stage of introducing the adhesive substance taking place whilst holding each fibre with the aid of a tool.

12. Process according to claim 7, the stage of positioning each fibre coinciding with the holding stage.

13. Process according to claim 7, the tool holding each fibre being an optical fibre gripping tool having a fibre gripping head with a width exceeding the fibre diameter.

14. Process according to claim 3, the gripping head having two posts making it possible to fix the optical fibre, as well as a suction pipe issuing between the two posts.

15. Process according to claim 7, the tool for holding each fibre being a gripping tool having a heating point able to heat a wax for surrounding at least partly the optical fibre.

16. Tool for gripping an optical fibre having a heating point able to heat a wax for at least partly surrounding an optical fibre.

17. Device according to claim 4, the second widening of at least one groove communicating with the second widening of at least one neighbouring groove.

18. Process according to claim 8, the widening closest to the end of each fibre being used for introducing the adhesive substance, the other being used for holding the fibre.

19. Process according to claim 9, the stage of introducing the adhesive substance taking place prior to the positioning of each fibre in the groove.

20. Process according to claim 9, the stage of introducing the adhesive substance taking place whilst holding each fibre with the aid of a tool.

21. Process according to claim 9, the stage of positioning each fibre coinciding with the holding stage.

22. Process according to claim 12, the tool holding each fibre being an optical fibre gripping tool having a fibre gripping head with a width exceeding the fibre diameter.

23. Process according to claim 12, the tool for holding each fibre being a gripping tool having a heating point able to heat a wax for surrounding at least partly the optical fibre.

\* \* \* \* \*